United States Patent
Chien et al.

(10) Patent No.: US 12,260,577 B2
(45) Date of Patent: Mar. 25, 2025

(54) METHOD FOR TRAINING DEPTH ESTIMATION MODEL, METHOD FOR ESTIMATING DEPTH, AND ELECTRONIC DEVICE

(71) Applicant: HON HAI PRECISION INDUSTRY CO., LTD., New Taipei (TW)

(72) Inventors: Yu-Hsuan Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 415 days.

(21) Appl. No.: 17/954,535

(22) Filed: Sep. 28, 2022

(65) Prior Publication Data
US 2023/0386062 A1   Nov. 30, 2023

(30) Foreign Application Priority Data
May 24, 2022   (CN) .......................... 202210570300.8

(51) Int. Cl.
*G06K 9/00* (2022.01)
*G06T 7/593* (2017.01)

(52) U.S. Cl.
CPC .... *G06T 7/593* (2017.01); *G06T 2207/10024* (2013.01); *G06T 2207/20081* (2013.01); *G06T 2207/20084* (2013.01); *G06T 2207/20228* (2013.01); *G06T 2207/30252* (2013.01)

(58) Field of Classification Search
CPC ........... G06T 7/593; G06T 2207/10024; G06T 2207/20081; G06T 2207/20084; G06T 2207/20228; G06T 2207/30252

USPC ......................................................... 382/106
See application file for complete search history.

(56) References Cited

PUBLICATIONS

Guizilini, Vitor, et al. "Learning optical flow, depth, and scene flow without real-world labels." IEEE Robotics and Automation Letters 7.2 (2022): 3491-3498. (Year: 2022).*
Heide, Nina Felicitas, Samuel Garner, and Michael Heizmann. "UEM-CNN: enhanced stereo matching for unstructured environments with dataset filtering and novel error metrics." ISR 2020; 52th International Symposium on Robotics. VDE, 2020. (Year: 2020).*
Tang, Mengxia, et al. "Encoder-decoder structure with the feature pyramid for depth estimation from a single image." IEEE Access 9 (2021): 22640-22650. (Year: 2021).*

* cited by examiner

*Primary Examiner* — Jonathan S Lee
(74) *Attorney, Agent, or Firm* — ScienBiziP, P.C.

(57) ABSTRACT

A method for training a depth estimation model implemented in an electronic device includes obtaining a first image pair from a training data set; inputting the first left image into the depth estimation model, and obtaining a disparity map; adding the first left image and the disparity map, and obtaining a second right image; calculating a mean square error and cosine similarity of pixel values of all corresponding pixels in the first right image and the second right image; calculating mean values of the mean square error and the cosine similarity, and obtaining a first mean value of the mean square error and a second mean value of the cosine similarity; adding the first mean value and the second mean value, and obtaining a loss value of the depth estimation model; and iteratively training the depth estimation model according to the loss value.

16 Claims, 4 Drawing Sheets

METHOD FOR TRAINING DEPTH ESTIMATION MODEL, METHOD FOR ESTIMATING DEPTH, AND ELECTRONIC DEVICE

FIELD

The subject matter herein generally relates to image processing, and particularly to an electronic device, a method for training a depth estimation model, and a method for estimating depth.

BACKGROUND

Depth estimation of images to establish distances to imaged objects is a fundamental requirement in the field of machine vision, which can be applied in autonomous driving, scene understanding, robotics, 3D reconstruction, photography, intelligent medicine, intelligent human-computer interaction, space mapping, augmented reality etc. For example, in the field of autonomous driving, depth information from images can be used to locate and identify obstacles in front of the vehicle, such as whether there are pedestrians or other vehicles in front of the vehicle.

Depth estimation obtains depth information by reconstructing the image. However, in the existing depth estimation method, there is small color difference between pixels in the low-texture area of the image, which results in misjudgment of pixels in the low-texture area, and affects the accuracy of depth information.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
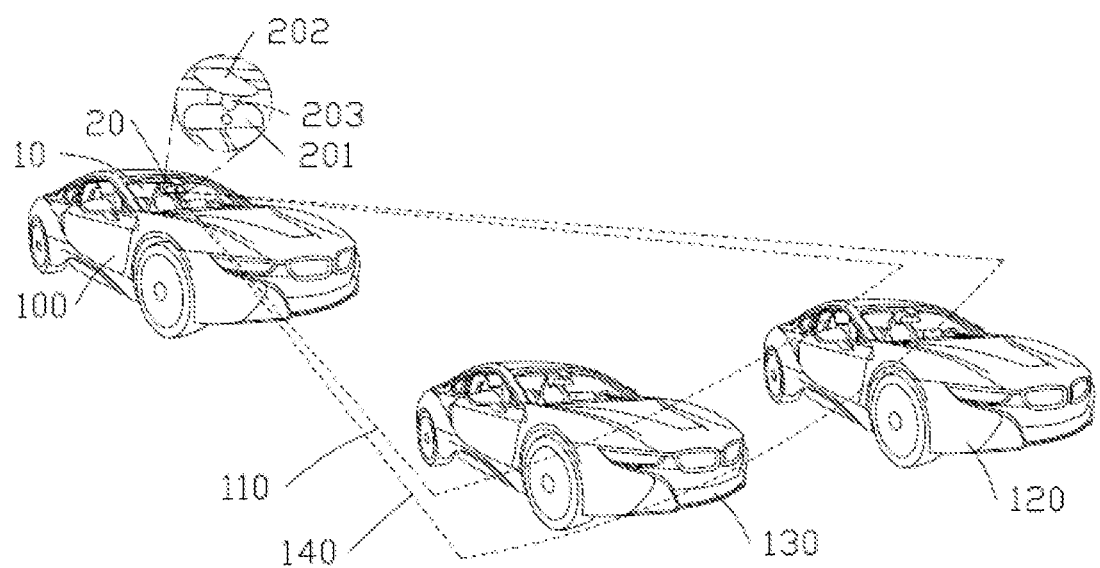
FIG. 1 illustrates a flowchart of an embodiment of an application environment of a method for estimating depth according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the terms and their equivalents without excluding other elements or articles. The terms "connect", "link" or the like are not limited to physical or mechanical connection, but may include electrical connections, whether direct or indirect.

Depth estimation is used to obtain distance information, by relating each pixel in the image to a camera device. An image including distance information is a depth image.

The pixel coordinates of the same object in two images are different, the pixel coordinates of the object closer to the camera are different, and the pixel coordinates of the same object farther away from the camera are smaller. Parallax is the difference in pixel coordinates of points in the same world coordinate system in different images. The parallax between different images can be converted into the distance from the object to the camera according to the camera parameters, that is, the distance is the depth.

Taking an image in a stereo image (in a pair of images which includes left image and right image) as a reference image (e.g., the left image), a size of the left image is the size of the reference image, and the image whose element value is the disparity value is a disparity map. Disparity estimation is a process of obtaining a disparity value of corresponding pixels between the left image and the right image, that is, the stereo matching process.

An autoencoder is an Artificial Neural Network (ANN) used in semi-supervised learning and unsupervised learning, the autoencoder takes input information as a learning target, and performs representation learning on the input information. The autoencoder includes an encoder and a decoder. According to a learning paradigm, autoencoders can be divided into contractive autoencoders, regularized autoencoders, and variational autoencoders (VAE). Depending on the type of construction, the autoencoder can be a neural network with a feedforward structure or a recursive structure.

The depth estimation method provided in the embodiment is applied to a scenario of automatic driving. It is understood that the depth estimation method provided in the embodiment is not limited to be applied in such scenario.

Referring to FIG. 1, a vehicle 1 includes a depth estimation system 20. The depth estimation system 20 is arranged in an interior compartment behind a windshield 10 of the vehicle 100. The depth estimation system 20 includes a camera device 201, a distance acquisition device 202, and a processor 203. The processor 203 is coupled with the camera device 201 and the distance acquisition device 202.

It can be understood that the camera device 201, the distance acquisition device 202, and the processor 203 can be arranged in other positions on the vehicle 100, and the camera device 201 can capture images of the view in front of the vehicle 100, the distance acquisition device 202 can detect the distance between the object in front of the vehicle 100 and the vehicle 100. For example, the camera device 201 and the distance acquisition device 202 may be located in the metal grille or front bumper of the vehicle 100. Further, although FIG. 1 shows only one distance acquisition device 202, the vehicle 100 may have a number of distance acquisition devices 202 in different directions (e. g., a side, a front, a rear of the vehicle 100, etc.). The distance acquisition devices 202 may also be arranged at positions such as windshields, door panels, bumpers, or metal grilles.

In one embodiment, the camera device 201 on the vehicle 100 can capture images of scenes in front of and both sides of the vehicle 100. As illustrated in FIG. 1, in a horizontal coverage area 110 (shown by dashed lines) that can be detected by the camera device 201, there are two objects, a vehicle 120 and a vehicle 130. The camera device 201 can capture images of the vehicle 120 and the vehicle 130 in front of the vehicle 100.

In some embodiments, the camera device 201 may be a binocular camera or a monocular camera.

In some embodiments, the camera device 201 may be implemented as an automobile data recorder. The automobile data recorder is used to record information such as images and sounds during travelling of the vehicle 100. After the vehicle 100 is installed with the automobile data recorder, the automobile data recorder can record the images and sounds of the entire travelling process of the vehicle 100, thereby providing effective evidence for traffic accidents. For example, in addition to the above functions, the functions provided by the automobile data recorder may also include functions such as global positioning system (GPS), driving track capture, remote monitoring, electronic dog, navigation, etc., which is not specifically limited.

The distance acquisition device 202 may be used to detect objects in front of and on both sides of the vehicle 100, and obtain the distance between an object and the distance acquisition device 202. As shown in FIG. 1, the distance acquisition device 202 on the vehicle 100 may obtain the distance between the vehicle 120 and the distance acquisition device 202, and the distance between the vehicle 130 and the distance acquisition device 202. The distance acquisition device 202 may be an infrared sensor, a Lidar, a Radar, or the like.

For example, the distance acquisition device 202 is a radar, the radar utilizes radio frequency (RF) waves to determine the distance, direction, speed and/or height of objects in front of the vehicle. In detail, a radar includes a transmitter and a receiver, the transmitter transmits radar waves (i.e., RF signals), and the RF waves will be reflected when encountering objects on the propagation path. RF waves reflected by the object return a small fraction of energy to the receiver. As illustrated in FIG. 1, the radar is configured to transmit the RF signals through the windshield in the horizontal coverage area 140 and to receive RF signals reflected by any object within the horizontal coverage area 140, so as to receive a 3D point cloud image of any object.

In one embodiment, the horizontal coverage area 110 and the horizontal coverage area 140 may completely or partially overlap.

In some embodiments, the camera device 201 may capture images of the scene within the horizontal coverage area 110 in every time period. Likewise, the radar may capture the three-dimensional point cloud images of the scene within the horizontal coverage area 140 in every time period. The time period of the camera device 201 and the radar for capturing the images may be the same or different. The images and three-dimensional point cloud images captured by each camera device 201 may be marked with a timestamp. When the time period of the camera device 201 and the radar for capturing the images are different, the timestamps can be used to simultaneously or nearly simultaneously select the captured image and the 3D point cloud image for further processing (e.g., image fusion).

The three-dimensional point cloud, also known as a laser point cloud (PCD) or point cloud, can be a series of point sets for reflecting spatial distribution and surface features of target obtained by obtaining a three-dimensional spatial coordinates of each sampling point on the surface of the object under the same spatial reference system, using the laser. Compared with the image, the three-dimensional point cloud includes more three-dimensional space information, that is, the distance information between the object and the distance acquisition device 202 is included.

For example, as illustrated in FIG. 1, at time T0, the camera device 201 may capture the images of the vehicle 120 and the vehicle 130. At the same time (time T0), the distance acquisition device 202 can also obtain the three-dimensional point cloud image within the horizontal coverage area 140, that is, the distance information between the vehicle 120 and the distance acquisition device 202, and the distance information between the vehicle 130 and the distance acquisition device 202 are obtained at the time T0.

In one embodiment, the processor 203 may recognize depth of objects in the captured scene based on the images of the scene captured by the camera device 201 at the same time and the distance information of the same scene captured by the distance acquisition device 202. The objects may be other vehicles, pedestrians, road signs, or obstacles.

It can be understood that the structure illustrated in the embodiment does not constitute a specific limitation on the depth estimation system. In other embodiments, the depth estimation system may include more or fewer components than shown, or some components may be combined, or some components may be split, or may have a different arrangement of components.

Figure 2:
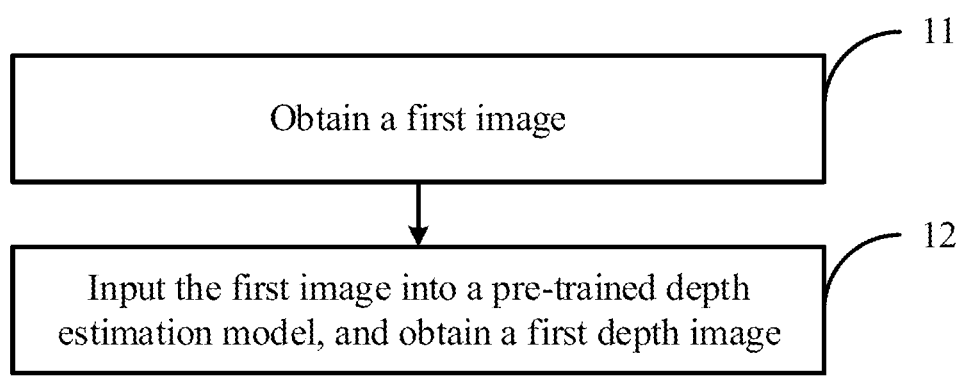
FIG. 2 illustrates a flowchart of an embodiment of a method for estimating depth according to the present disclosure.

FIG. 2 illustrates a flowchart of an embodiment of a method for estimating depth, the method for estimating depth can be applied in the depth estimating system 20. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, obtaining a first image.

In one embodiment, the depth estimation system 20 may obtain the first image captured by the camera device. For example, the camera device can be a monocular camera, the monocular camera can record a video, and the depth estimation system can cut out an image frame from the video as the first image. The monocular camera can also capture an image, and the captured image is taken as the first image.

At block 12, inputting the first image into a pre-trained depth estimation model, and obtaining a first depth image.

In some embodiments, the depth estimation model may include an autoencoder (AE) and an image conversion module. After the depth estimation system inputs the first image into the depth estimation model, the autoencoder processes the first image and outputs a disparity map corresponding to the first image. The image conversion module then converts the disparity map to the first depth image.

In other embodiments, the depth estimation model may omit the image conversion module. The depth estimation model processes the first image, and outputs a disparity map corresponding to the first image. The depth estimation system then converts the disparity map to the first depth image.

The training method of the depth estimation model is described in detail below.

Figure 3:
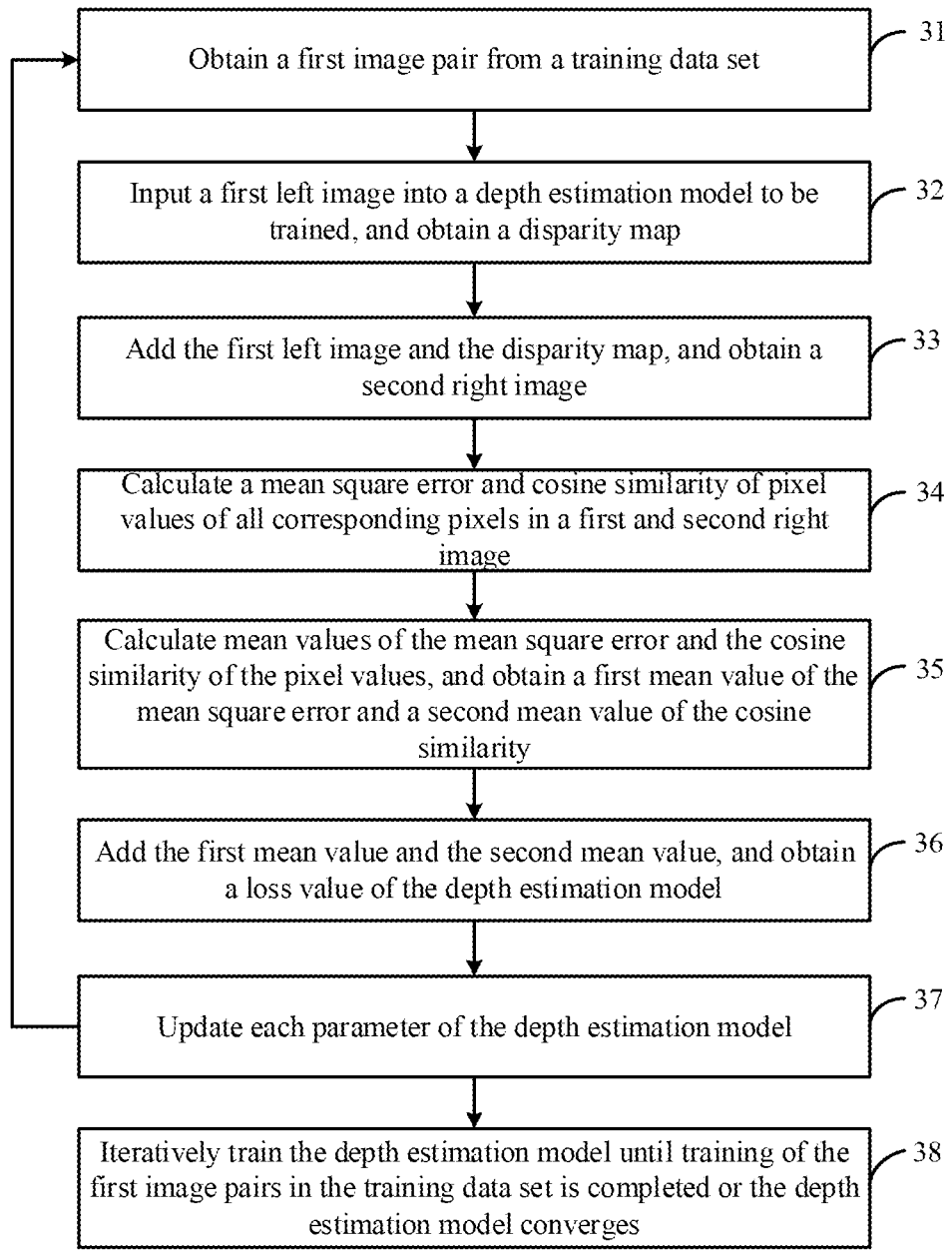
FIG. 3 illustrates a flowchart of an embodiment of a method for training a depth estimation model according to the present disclosure.

FIG. 3 illustrates a flowchart of an embodiment of a method for training a depth estimating model. The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 31.

At block 31, obtaining a first image pair from a training data set.

In one embodiment, the first image pair includes a first left image and a first right image.

It can be understood that the image pair includes two images of the same scene captured by the camera device at the same time, which includes the left image and the right image. The sizes and the number of pixels of the left and right images are the same.

In one embodiment, the training data set may be a data set of images captured by a binocular camera when the vehicle is travelling. The images captured by the binocular camera include image pairs of the same scene captured by two cameras at the same time.

At block 32, inputting the first left image into the depth estimation model to be trained, and obtaining a disparity map.

It can be understood that the depth estimation model to be trained can be an initialization model, the parameters of the initialization model can be preset according to actual requirement.

At block 33, adding the first left image and the disparity map, and obtaining a second right image.

In one embodiment, the second right image is the right image predicted by the depth estimation model. The sizes and the number of pixels of the first and second right images are the same.

At block 34, calculating a mean square error and cosine similarity of pixel values of all corresponding pixels in the first right image and the second right image.

The corresponding pixels are two pixels in the two images that have a corresponding position relationship. For example, the first right image includes a first pixel, the second right image includes a second pixel corresponding to the first pixel, and the position of the first pixel in the first right image is the same as that of the second pixel in the second right image.

It can be understood that the pixels in the image have pixel values of three color channels of red (R), green (G), and blue (B).

In one embodiment, the mean square error of pixel values of all corresponding pixels in the first right image and the second right image is calculated according to the following formula (1):

$$MSE = 1/n \sum_{i=1}^{n} (\frac{1}{3} \sum_{k=1}^{3} (y_{ik} - y'_{ik}))^2 \qquad \text{(formula (1))}.$$

In formula (1), n is the number of pixels in the first right image or the second right image, $y_{ik}$ is the pixel value of the k-th color channel of the i-th pixel in the first right image, and $y'_{ik}$ is the pixel value of the k-th color channel of the i-th pixel in the second right image.

In one embodiment, the mean square error can measure the difference of pixel values between the two corresponding pixels, and by minimizing the mean square error, the difference of pixel values between the two corresponding pixels can be minimized. The smaller the mean square error is, the higher the prediction accuracy of the depth estimation model is. When the mean square error is 0, it indicates that the pixel values of the two corresponding pixels are the same, that is, the predicted value of the depth estimation model is the same as the real value.

In one embodiment, the cosine similarity cos(A) of pixel values of all corresponding pixels in the first right image and the second right image is calculated according to the following formula (2):

$$\cos(\theta) = 1 - \sum_{i=1}^{n} \sum_{k=1}^{3} y_{ik} y'_{ik} / \sqrt{\sum_{k=1}^{3} y_{ik}^2} \cdot \sqrt{\sum_{k=1}^{3} y'_{ik}^2} \qquad \text{(formula (2))}.$$

In one embodiment, the cosine similarity can measure the color difference between two corresponding pixels in the color space. The smaller the angle θ between the RGB values of the two corresponding pixels is, the smaller the cosine similarity is, which indicates that the colors of the two pixels are more similar. When the angle θ between the RGB values of two corresponding pixels is 0, the cosine similarity cos(θ)=0, which indicates that the two pixels have a same color.

At block 35, calculating mean values of the mean square error and the cosine similarity of the pixel values of all corresponding pixels in the first right image and the second right image, and obtaining a first mean value of the mean square error and a second mean value of the cosine similarity.

In one embodiment, each pixel in the first right image and the second right image is polled in turn, and the mean square error of the pixel values of each corresponding pixel in the first right image and the second right image can be sequentially calculated by formula (1) until a number of mean square errors of the pixel values of all corresponding pixels is obtained. The first mean value can be obtained by calculating the mean value of the number of mean square errors.

Similarly, each pixel in the first right image or the second right image is polled in turn, and the cosine similarity of the pixel values of each corresponding pixel in the first right image and the second right image can be sequentially calculated by formula (2), until a number of cosine similarities of the pixel values of all corresponding pixels is obtained. The second mean value can be obtained by calculating the mean value of the number of cosine similarities.

At block 36, adding the first mean value and the second mean value, and obtaining a loss value of the depth estimation model.

In one embodiment, when the loss value of the depth estimation model is 0, the depth estimation model converges.

At block 37, updating parameters of the depth estimation model by using a back-propagation algorithm according to the loss value.

In one embodiment, the parameters of the depth estimation model are updated by using the back-propagation algorithm, so that the loss between the actual value and the predicted value can be reduced.

At block 38, cyclically executing blocks 31 to 37, and iteratively training the depth estimation model until training of the first image pairs in the training data set is completed or the depth estimation model converges.

In some embodiments, the training of the depth estimation model is completed when training of the first image pairs in the training data set is completed. At this time, the parameters of the depth estimation model with the smallest loss value are selected as the final model parameters.

In other embodiments, during the training process of the depth estimation model, when the depth estimation model converges, the training is completed. At this time, the parameters of the converged depth estimation model are used as the final model parameters.

It can be understood that the calculation of loss value of the depth estimation model combines the mean square error and cosine similarity, which can not only improve the prediction accuracy of the depth estimation model, but also improve the color-sensitivity of the depth estimation model, allowing color differences between individual pixels even in low-texture areas to be distinguished. Obtaining depth images by using the depth estimation model can improve the accuracy of depth information.

Figure 4:
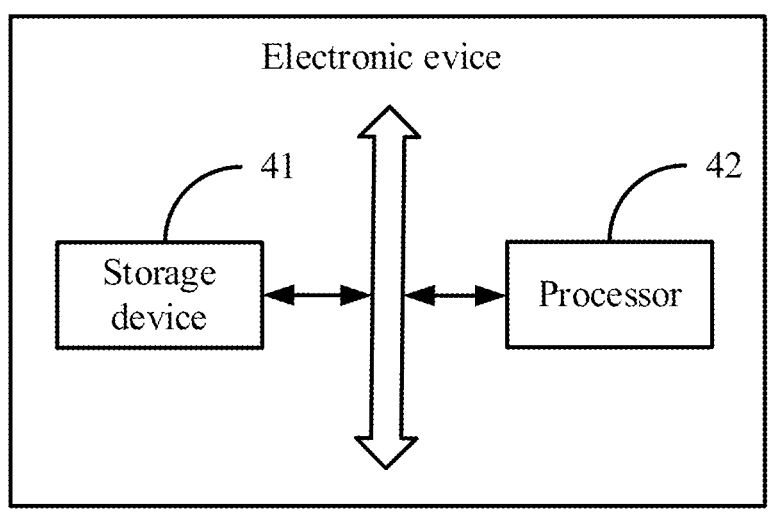
FIG. 4 is a block diagram of an embodiment of an electronic device according to the present disclosure.

FIG. 4 illustrates the electronic device 40 in one embodiment. The electronic device 40 includes, but is not limited to, a processor 42, a storage device 41, and a computer program. FIG. 4 illustrates only one example of the electronic device 40. Other examples can include more or fewer components than as illustrated or can have a different configuration of the various components in other embodiments.

In one embodiment, the processor 42 and the processor 203 can be the same. The electronic device 40 can further include a camera device and a distance acquisition device.

The processor 42 can be a central processing unit (CPU), a microprocessor, or other data processor chip that performs functions in the electronic device 40.

In one embodiment, the storage device 41 can include various types of non-transitory computer-readable storage mediums. For example, the storage device 41 can be an internal storage system, such as a flash memory, a random access memory (RAM) for the temporary storage of information, and/or a read-only memory (ROM) for permanent storage of information. The storage device 41 can also be an external storage system, such as a hard disk, a storage card, or a data storage medium.

The storage device 41 stores instructions, and the processor 42 executes the computer program stored in the storage device 41 for implementing the method for training a depth estimating model and the method for estimating depth provided in the embodiments of the present disclosure. The computer program includes a training program, an estimating program, and instructions.

Upon execution of the instructions stores in the storage device 41, the processor 42 is configured to:
  obtain a first image; and
  input the first image into a pre-trained depth estimation model, and obtain a first depth image.

Upon execution of the instructions stores in the storage device 41, the processor 10 is further configured to:
  obtain a first image pair from a training data set;
  input the first left image into the depth estimation model to be trained, and obtain a disparity map;
  add the first left image and the disparity map and obtain a second right image;
  calculate a mean square error and cosine similarity of pixel values of all corresponding pixels in the first right image and the second right image;
  calculate mean values of the mean square error and the cosine similarity of the pixel values of all corresponding pixels in the first right image and the second right image, and obtain a first mean value of the mean square error and a second mean value of the cosine similarity;
  add the first mean value and the second mean value, and obtain a loss value of the depth estimation model;
  update each parameter of the depth estimation model by using a back-propagation algorithm according to the loss value; and
  iteratively train the depth estimation model until training of the first image pairs in the training data set is completed or the depth estimation model converges.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor; and
   a storage device coupled to the at least one processor and storing instructions for execution by the at least one processor to cause the at least one processor to:
   obtain a first image pair from a training data set, the first image pair comprising a first left image and a first right image;
   input the first left image into a depth estimation model to be trained, and obtain a disparity map;
   add the first left image and the disparity map, and obtain a second right image;
   calculate a mean square error and a cosine similarity of pixel values of all corresponding pixels in the first right image and the second right image;
   calculate mean values of the mean square error and the cosine similarity of the pixel values of all corresponding pixels in the first right image and the second right image, and obtain a first mean value of the mean square error and a second mean value of the cosine similarity;
   add the first mean value and the second mean value, and obtain a loss value of the depth estimation model; and
   iteratively train the depth estimation model according to the loss value.

2. The electronic device according to claim 1, wherein the at least one processor is further caused to:
   update each parameter of the depth estimation model by using a backpropagation algorithm according to the loss value; and
   iteratively train the depth estimation model until training of the first image pairs in the training data set is completed or the depth estimation model converges.

3. The electronic device according to claim 2, wherein the at least one processor is further caused to:
   determine parameters of the depth estimation model with a smallest loss value to be final model parameters.

4. The electronic device according to claim 2, wherein the at least one processor is further caused to:
   determine parameters of the depth estimation model when converging to be final model parameters.

5. The electronic device according to claim 2, wherein the at least one processor is further caused to:
in response that the loss value of the depth estimation model is 0, determine that the depth estimation model converges.

6. The electronic device according to claim 1, wherein the mean square error of pixel values of all corresponding pixels in the first right image and the second right image is calculated according to a formula of:

$$MSE = \frac{1}{n}\sum_{i=1}^{n}\left(\frac{1}{3}\sum_{k=1}^{3}(y_{ik} - y'_{ik})\right)^2,$$

in which, n represents the number of pixels in the first right image or the second right image, $y_{ik}$ represents a pixel value of a k-th color channel of a i-th pixel in the first right image, and $y'_{ik}$ represents a pixel value of a k-th color channel of a i-th pixel in the second right image.

7. The electronic device according to claim 1, wherein the cosine similarity of pixel values of all corresponding pixels in the first right image and the second right image is calculated according to a formula of:

$$\cos(\theta) = 1 - \sum_{i=1}^{n} \frac{\sum_{k=1}^{3} y_{ik} \cdot y'_{ik}}{\sqrt{\sum_{k=1}^{3} y_{ik}^2} \cdot \sqrt{\sum_{k=1}^{3} y'^2_{ik}}},$$

in which, n represents the number of pixels in the first right image or the second right image, $y_{ik}$ represents a pixel value of a k-th color channel of an i-th pixel in the first right image, and $y'_{ik}$ represents a pixel value of a k-th color channel of an i-th pixel in the second right image.

8. A method for estimating depth implemented in an electronic device comprising:
obtaining a first image; and
inputting the first image into a depth estimation model pre-trained by a method for training the depth estimation model in claim 1, and obtaining a first depth image.

9. The method according to claim 8, wherein obtaining a first depth image comprises:
inputting the first image into the depth estimation model, and obtaining a disparity map corresponding to the first image; and
converting the disparity map to the first depth image.

10. A method for training a depth estimation model implemented in an electronic device comprising:
obtaining a first image pair from a training data set, the first image pair comprising a first left image and a first right image;
inputting the first left image into the depth estimation model to be trained, and obtaining a disparity map;
adding the first left image and the disparity map, and obtaining a second right image;
calculating a mean square error and cosine similarity of pixel values of all corresponding pixels in the first right image and the second right image;
calculating mean values of the mean square error and the cosine similarity of the pixel values of all corresponding pixels in the first right image and the second right image, and obtaining a first mean value of the mean square error and a second mean value of the cosine similarity;
adding the first mean value and the second mean value, and obtaining a loss value of the depth estimation model; and
iteratively training the depth estimation model according to the loss value.

11. The method according to claim 10, wherein iteratively training the depth estimation model according to the loss value comprises:
updating each parameter of the depth estimation model by using a backpropagation algorithm according to the loss value; and
iteratively training the depth estimation model until training of the first image pairs in the training data set is completed or the depth estimation model converges.

12. The method according to claim 11, further comprising:
determining parameters of the depth estimation model with a smallest loss value to be final model parameters.

13. The method according to claim 11, further comprising:
determining parameters of the depth estimation model when converging to be final model parameters.

14. The method according to claim 11, further comprising:
in response that the loss value of the depth estimation model is 0, determining that the depth estimation model converges.

15. The method according to claim 10, wherein the mean square error of pixel values of all corresponding pixels in the first right image and the second right image is calculated according to the formula of:

$$MSE = \frac{1}{n}\sum_{i=1}^{n}\left(\frac{1}{3}\sum_{k=1}^{3}(y_{ik} - y'_{ik})\right)^2,$$

in which, n represents the number of pixels in the first right image or the second right image, $y_{ik}$ represents a pixel value of a k-th color channel of an i-th pixel in the first right image, and $y'_{ik}$ represents a pixel value of a k-th color channel of an i-th pixel in the second right image.

16. The method according to claim 10, wherein the cosine similarity of pixel values of all corresponding pixels in the first right image and the second right image is calculated according to the formula of:

$$\cos(\theta) = 1 - \sum_{i=1}^{n} \frac{\sum_{k=1}^{3} y_{ik} \cdot y'_{ik}}{\sqrt{\sum_{k=1}^{3} y_{ik}^2} \cdot \sqrt{\sum_{k=1}^{3} y'^2_{ik}}},$$

in which, n represents the number of pixels in the first right image or the second right image, $y_{ik}$ represents a pixel value of a k-th color channel of an i-th pixel in the first right image, and $y'_{ik}$ represents a pixel value of a k-th color channel of an i-th pixel in the second right image.

* * * * *